(12) United States Patent  
Hirakawa

(10) Patent No.: US 9,170,763 B2  
(45) Date of Patent: Oct. 27, 2015

(54) INFORMATION PROCESSING APPARATUS AND CONTROL METHOD

(71) Applicant: CANON KABUSHIKI KAISHA, Tokyo (JP)

(72) Inventor: Satoshi Hirakawa, Fuchu (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/218,135

(22) Filed: Mar. 18, 2014

(65) Prior Publication Data

US 2014/0300928 A1      Oct. 9, 2014

(30) Foreign Application Priority Data

Apr. 4, 2013 (JP) ................. 2013-078988

(51) Int. Cl.
| | |
|---|---|
| *G03F 3/10* | (2006.01) |
| *G06F 3/12* | (2006.01) |
| *H04N 1/40* | (2006.01) |
| *G06F 9/44* | (2006.01) |

(52) U.S. Cl.
CPC .............. *G06F 3/123* (2013.01); *G06F 3/1203* (2013.01); *G06F 3/1289* (2013.01); *G06F 9/4411* (2013.01); *G06F 3/1231* (2013.01)

(58) Field of Classification Search
None
See application file for complete search history.

(56) References Cited

U.S. PATENT DOCUMENTS

| 8,441,667 | B2 | 5/2013 | Hirakawa | |
|---|---|---|---|---|
| 2005/0200889 | A1* | 9/2005 | Oomura | 358/1.15 |
| 2007/0046972 | A1* | 3/2007 | Hirai | 358/1.13 |
| 2007/0046996 | A1* | 3/2007 | Matsuda | 358/1.18 |
| 2010/0178066 | A1* | 7/2010 | Asahara | 399/12 |
| 2010/0214603 | A1* | 8/2010 | Tamura | 358/1.15 |
| 2012/0159010 | A1* | 6/2012 | Jiang et al. | 710/16 |
| 2013/0222825 | A1 | 8/2013 | Hirakawa | |

FOREIGN PATENT DOCUMENTS

JP       2011-013816 A       1/2011

* cited by examiner

*Primary Examiner* — Marivelisse Santiago Cordero
*Assistant Examiner* — Moustapha Diaby
(74) *Attorney, Agent, or Firm* — Fitzpatrick, Cella, Harper & Scinto

(57) ABSTRACT

An information processing apparatus in which an OS is executed that provides a first UI environment (touchscreen UI) and a second UI environment different from the first UI environment, is provided in which, if identification information of a peripheral device connected to a communication network has been obtained when the first UI environment is provided, a device control application for controlling the peripheral device is obtained from a service that manages applications operable in the first UI environment, using the identification information.

14 Claims, 18 Drawing Sheets

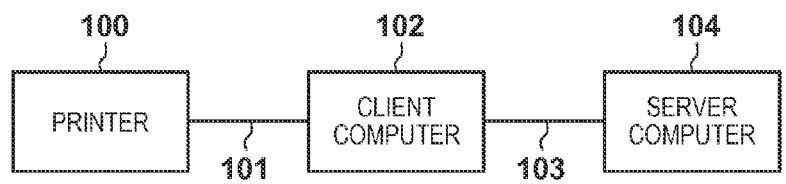
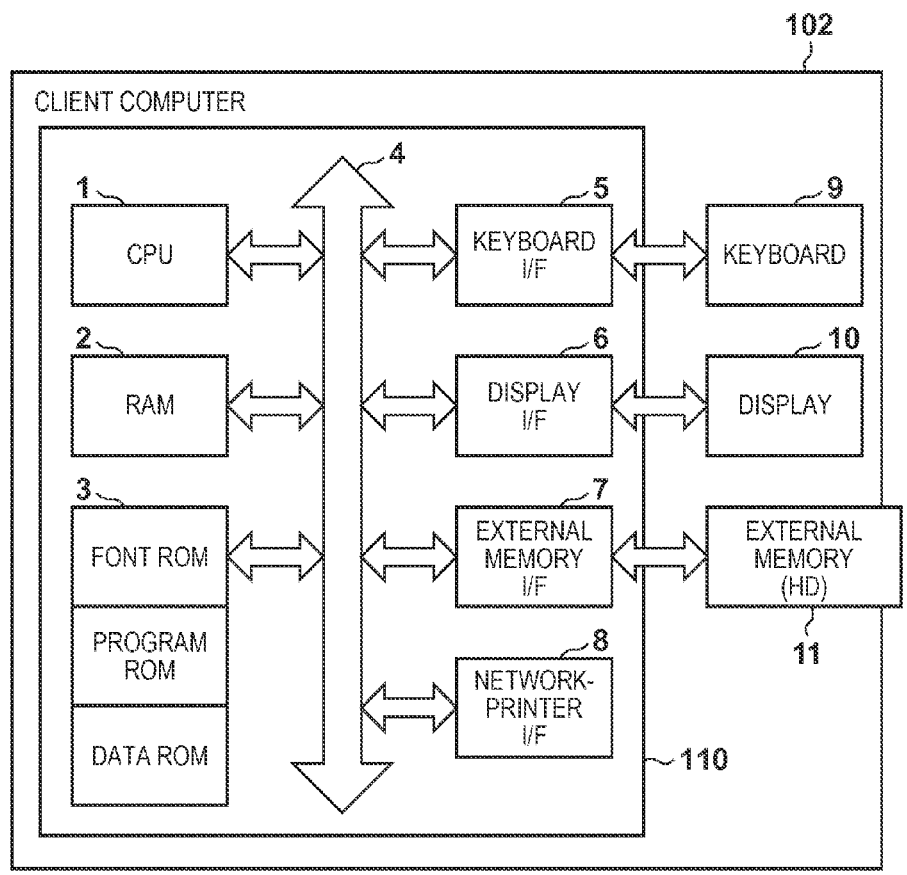

F I G. 14

| APP NAME | MATCH IN MDL | MATCH IN CID | SUPPORTED FUNCTION | MATCHING SCORE |
|---|---|---|---|---|
| DEVICE CONTROL APP A | O | × | 2 FUNCTIONS | 30 POINTS |
| DEVICE CONTROL APP B | × | O | — | 5 POINTS |
| DEVICE CONTROL APP C | O | O | 1 FUNCTION | 25 POINTS |

MATCH IN MDL = 10 POINTS
MATCH IN CID = 5 POINTS
FUNCTION POINTS = NUMBER OF FUNCTIONS * 10 POINTS

INFORMATION PROCESSING APPARATUS AND CONTROL METHOD

BACKGROUND OF THE INVENTION

1. Field of the Invention

The present invention relates to techniques of installing a suitable device driver, device control application, etc. in order to use a peripheral device, such as a printer etc. that is connected to, for example, a computer.

2. Description of the Related Art

Plug and Play is well known as a technique of incorporating into a computer a device driver for enabling use of a peripheral device such as a printer etc. when the device is connected to a computer.

By employing the Plug-and-Play technology, users are freed from having to install a device driver or adjusting the settings for use of a peripheral device, which it takes a lot of time and effort to do, resulting in a significant improvement in convenience.

Plug and Play for printers that is performed by Windows (trademark), which is an operating system (OS) of Microsoft Corporation (U.S.), obtains identification information from a printer through an interface, such as Universal Serial Bus (USB) or Web Services on Devices (WSD). The OS retrieves an optimum device driver based on the obtained identification information, installs the device driver, and sets the output port to a connection port at which the printer has been detected.

The Windows OS's Plug and Play provides the function of obtaining the model identification information (MDL) of a printer from the printer, searching for a printer driver corresponding to the model identification information (MDL), installing the printer driver, and adjusting settings for the output port. If no printer driver corresponding to the model identification information (MDL) is found, the compatible identification information (CID) of the printer is obtained, a printer driver corresponding to the compatible identification information (CID) is searched for, the printer driver is installed, and the settings for the output port are adjusted.

Thus, a printer driver suitable for a model corresponding to a printer's model identification information (MDL) can be installed with a higher priority. If no printer driver suitable for a model is found, a printer driver common to printers of a family or a class corresponding to a printer's compatible identification information (CID) is introduced.

Note that a related-art technique of using a Plug-and-Play system provided by an operating system, such as that described above is disclosed in Japanese Patent Laid-Open No. 2011-013816. In this document, a printer searches for another printer. In this case, if a printer having a device ID for a shared printer driver is found, the device ID for the shared printer driver is returned in response to a request for a device ID in Plug and Play. In this example related-art technique, the printer rewrites the device ID returned in response to the Plug-and-Play request with the device ID for the shared printer driver, whereby the printer to be installed is controlled.

In recent years, there have been many small-screen devices having only a touchscreen, such as a mobile device (e.g., a mobile telephone etc.), a tablet computer, and the like. Therefore, some operating systems have been equipped with a new user interface (UI) environment that is optimized for operation of touchscreens (hereinafter referred to as a "touchscreen UI"). The touchscreen UI optimum for touchscreens provides a button arrangement that can be easily operated using the user's finger. On the other hand, the traditional UI environment in which a mouse or a keyboard is used for selection, instruction, etc., is referred to as a "desktop UI." There have also been some operating systems that allow the user to manually switch a display from the touchscreen UI to the desktop UI. In order to produce an application that operates on such an operation system, it is necessary to prepare different packages for the different UIs.

On the other hand, the OS imparts compatibility to a printer driver designed for the desktop UI so that the printer driver can be used even when there is a print request from an application for the touchscreen UI. As a result, the user can print using an original printer driver produced for the desktop UI, which is a traditional UI environment, even in an environment of another OS having the touchscreen UI.

A printer driver that is linked to model identification information (MDL) and is provided for each printer model is herein referred to as a "specific driver." A printer driver that is linked to compatible identification information (CID) and is common to a printer family or class is herein referred to as a "class driver." An application for using or controlling a peripheral device having a printing, scanning, or faxing function, that is produced as an application operable in the touchscreen UI, is herein referred to as a "device control app." As described in the "Field of the Invention" section, a Plug-and-Play system in which if no specific driver corresponding to model identification information (MDL) is found, a class driver corresponding to compatible identification information (CID) is introduced, has already been provided. By using this system, even if no specific driver is found in Plug and Play, a suitable class driver can be installed. Also, a necessary printer driver can be installed by the user's simple operation.

However, the specific and class drivers that are introduced by the Plug-and-Play system are not optimum for the touchscreen UI described in the "Field of the Invention" section. For example, to date, the touchscreen UI does not have the function of checking user information when printing is performed using a function, such as the secure print function, the department management function, etc., that is possessed by a printer driver. A pop-up UI that causes a dialog to pop up during printing to prompt the user to enter an input, has a functional limitation, such as necessity of displaying on the desktop UI, that is a traditional UI environment, etc.

The above limitation is not put on device control apps that are produced for the touchscreen UI. However, there is no simple system, such as Plug-and-Play, for introducing a device control app. Therefore, it is disadvantageously necessary for the user to install a device control app corresponding to each printer model by himself or herself.

SUMMARY OF THE INVENTION

The present invention has been made in view of the above-described conventional art to construct a system that can flexibly and easily provide a device control app to the user, taking into consideration various conditions, such as an UI environment in an information processing apparatus, etc.

According to one aspect of the present invention, there is provided an information processing apparatus in which an operating system (OS) is executed that provides a first user interface (UI) environment and a second UI environment different from the first UI environment, the device comprising: a first obtaining unit configured to obtain identification information of a peripheral device connected to a communication network, from the peripheral device; and a second obtaining unit configured to obtain a device control application for controlling the peripheral device, from a service that manages applications operable in the first UI environment, using the identification information of the peripheral device if the identification information of the peripheral device has been obtained by the first obtaining unit when the first UI environment is provided.

According to another aspect of the present invention, there is provided an information processing apparatus comprising: a first obtaining unit configured to obtain identification information of a peripheral device connected to a communication network, from the peripheral device; and a second obtaining unit configured to obtain a device control application for controlling the peripheral device using the identification information obtained by the first obtaining unit when class information contained in the identification information indicates that the peripheral device is a multi-functional peripheral, wherein the second obtaining unit, when a device control application corresponding to the identification information is not obtained, obtains a device driver corresponding to the identification information.

According to the present invention, a device control app can be flexibly and easily provided to the user, taking into consideration various conditions, such as an UI environment in an information processing apparatus, etc.

Further features of the present invention will become apparent from the following description of exemplary embodiments with reference to the attached drawings.

BRIEF DESCRIPTION OF THE DRAWINGS

FIG. 1 is a block diagram showing a system configuration of this embodiment.

FIG. 2 is a block diagram showing a configuration of a client computer 102.

FIG. 12 is a diagram showing a flow of a Plug-and-Play process in which a device control app 250, a specific driver 260, and a class driver 270 are objects to be searched for.

FIG. 13 is a diagram showing a flow of a process (step S1300) in which a device control app 250 optimum for a device ID 340 is searched for.

FIG. 14 is a diagram showing an example method for calculating a matching score.

FIG. 15 is a diagram showing a flow of a Plug-and-Play process in which a device control app 250, a specific driver 260, and a class driver 270 are objects to be searched for.

FIG. 16 is a diagram showing a flow of an installation process of a driver installer 800 in which a device control app 250, a specific driver 260, and a class driver 270 are objects to be searched for.

DESCRIPTION OF THE EMBODIMENTS (First Embodiment)

Figure 3:
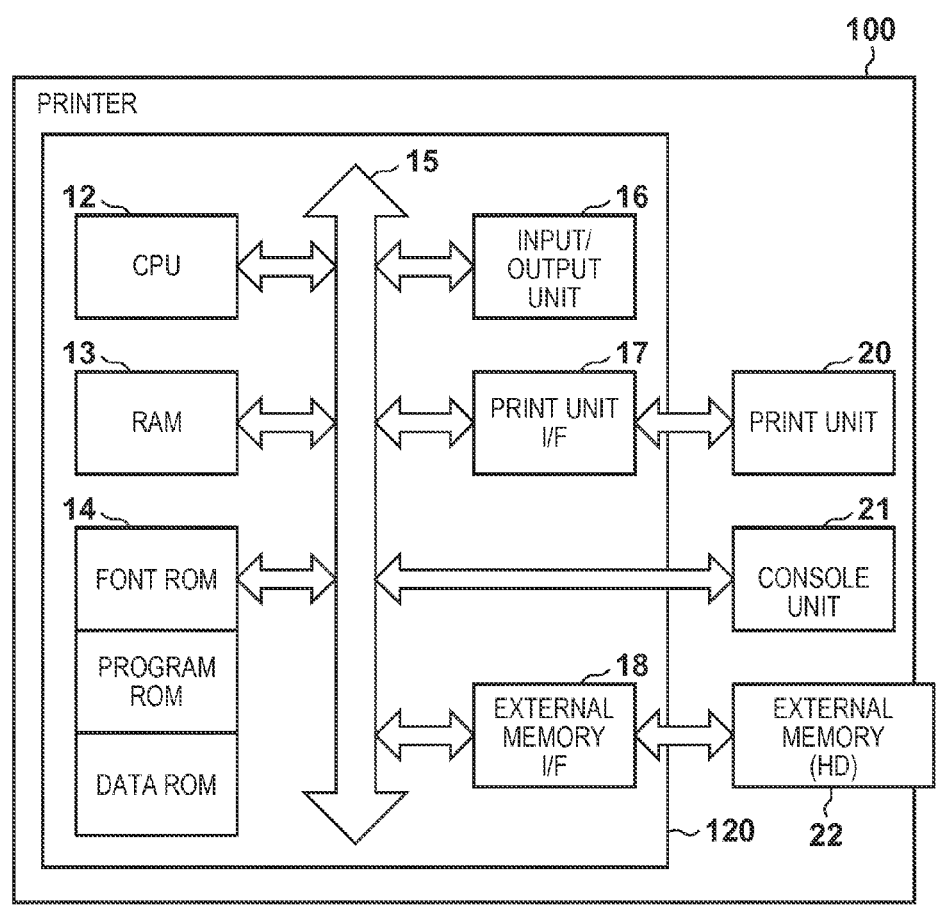
FIG. 3 is a block diagram showing a configuration of a printer 100.

Best modes for carrying out the present invention will now be described with reference to the accompanying drawings. FIG. 1 is a block diagram showing an example system configuration of the present invention. In FIG. 1, a system involved in installing a printer driver and a device control application (hereinafter referred to as a "device control app") includes a peripheral device, a client computer 102, and a server computer 104. The present invention will be described using a printer 100 as a specific example of the peripheral device. Other examples of the peripheral device to which the present invention is applicable include a scanner, a copier, a multi-functional peripheral, etc. The printer 100 and the client computer 102 are connected together through a connection medium 101 capable of bi-directional communication. The client computer 102 and the server computer 104 are connected together through a connection medium (communication network) 103 capable of communication, such as the Internet, an intranet, etc. Note that there may be a plurality of the server computers 104.

<Configuration of Computer>

FIG. 2 is a block diagram showing a configuration of an information processing apparatus that is representative of the client computer 102. The client computer 102 is controlled by a CPU 1. The CPU 1 can load to a RAM 2 a basic input/output system (BIOS control program) stored in a ROM 3, an operating system (OS) and various application programs stored in an external memory 11, etc., and execute these systems and applications. The external memory 11 is connected through an external memory interface 7 to a bus 4. A keyboard 9 on which the user enters an input and a display 10 that displays to the user the result of a process in the form of an image are connected to the client computer 102. The keyboard and the display are connected through a keyboard interface 5 and a display interface 6, respectively, to the bus 4. The client computer 102 also includes a network-printer I/F 8 that is used for communication with another information device or a device such as a printer etc.

Note that the server computer 104 is also configured as a single server apparatus or a cluster server apparatus that has a hardware configuration similar to that of the client computer 102 described with reference to FIG. 2.

<Configuration of Printer>

FIG. 3 is a block diagram showing a configuration of the peripheral device (printer 100). The printer 100 is controlled by a CPU 12. The CPU 12 can load to a RAM 13 a control program stored in a ROM 14 and various programs stored in an external memory 22, and execute these programs. The CPU 12 can perform printing by converting print data that is input through an input/output unit 16 based on an operation of the control program, into an image signal, and then outputting the image signal through a print unit interface 17 to a print unit 20. The CPU 12 also performs processes in response to various response requests that are input through the input/output unit 16 based on an operation of the control program, and outputs the results of the processes through the input/output unit 16. Note that a console unit 21 is connected to the printer 100 so that the user can enter an input directly into the printer 100 using the console unit 21. Other examples of the peripheral device include a scanner, a copier, a fax machine, etc. Note that these components are connected to a bus 15, and the external memory 22 is connected through an external memory interface 18 to the bus 15.

<Software Configuration of Client Computer>

Figure 4:
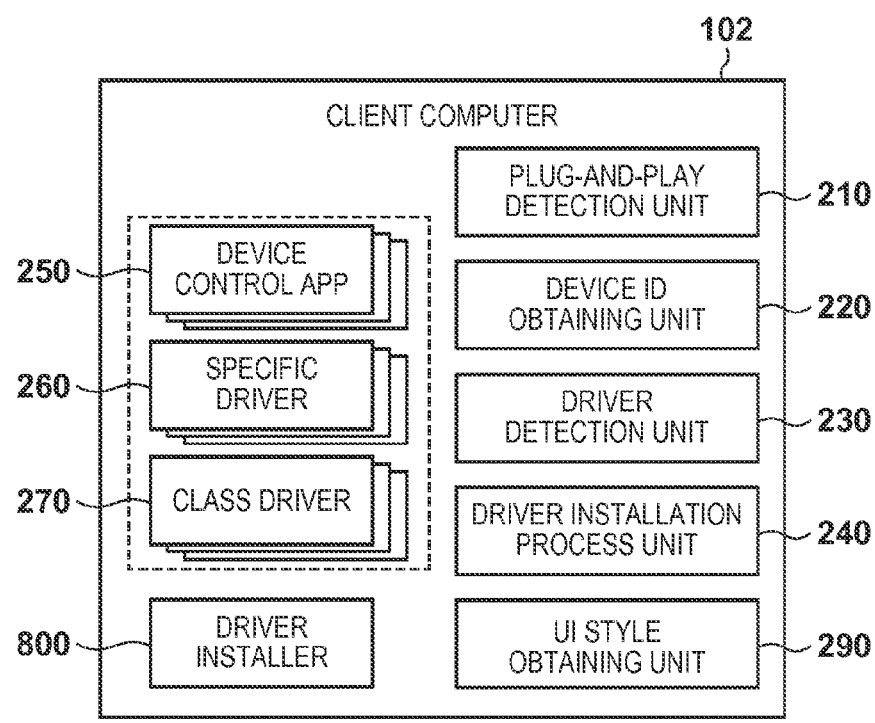
FIG. 4 is a block diagram showing a software configuration of the client computer 102.

FIG. 4 is a block diagram showing a software configuration of the client computer 102. The software configuration of the client computer 102 will be described with reference to FIG. 4.

A Plug-and-Play detection unit 210 detects a peripheral device that is newly added to the network through an interface, such as Universal Serial Bus (USB), Web Services on Devices (WSD), etc. Specifically, the detection occurs when the printer 100 is connected to the network or the printer 100 on the network is turned on. Although the device to be detected is not limited to a printer, a printer will be described as the device to be detected in this embodiment. A device ID obtaining unit 220 sends a request for obtaining a device ID to the printer 100 detected by Plug and Play, to obtain the device ID. The device ID will be described later. A driver search unit 230 searches for a device control app 250, a specific driver 260, and a class driver 270 that correspond to the device ID. Note that the search range (an area to be searched for a driver) of the driver search unit 230 may be a driver store that is a portion of a storage area of the client computer 102 that is managed by the OS. In addition, the area to be searched for a driver may include an external storage medium that is connected to the client computer 102. Still, in addition, the area to be searched for a driver may include a predetermined external server computer 104. A driver installation process unit 240 performs a process of installing the device control app 250, the specific driver 260, and the class driver 270 that have been found by the driver search unit 230. Note that the device control app 250, the specific driver 260, and the class driver 270 will be described later.

Note that it is assumed that the client computer 102 can store specific drivers 260 and class drivers 270 with which the OS is bundled or that are subsequently introduced. A UI style obtaining unit 290 performs a UI style information obtaining process of determining whether a UI environment displayed on the display 10 is a touchscreen UI or a desktop UI. Note that the touchscreen UI is a UI environment in which a display control etc. is performed and that is more suitable for operation on a touchscreen than the traditional desktop UI. A driver installer 800 is an application program that includes a Plug-and-Play detection unit, a device ID obtaining unit, and a driver search unit.

[Device Control App]

Device control apps 250 are applications having a printing, faxing, or scanning function, which support respective corresponding models and are designed to operate on the touchscreen UI. In a Plug-and-Play system that uses a device ID 340, the device control app 250 supports both or either of model identification information (MDL) and compatible identification information (CID). The device control app of this embodiment has a function of controlling a peripheral device, and provides a UI screen for setting the peripheral device. The screen is suited to operations on a touchscreen. For example, a switch and a button that are used for selection are large enough to allow the user to select using a finger. If a computer is not equipped with a keyboard, a virtual keyboard is displayed for a text box, etc. Thus, an operation can be easily performed by an operation on a touchscreen. Variable settings are similar to those of a traditional printer driver, including, for example, a paper size (e.g., A3, A4, etc.), a paper type, a layout, quality, a paper feed unit, the number of copies, the presence or absence of a margin, etc. Moreover, if the device control app supports a plurality of types of printers, the printer types may be selected. Moreover, the device control app also has the functionality of an application, and therefore, for example, can select a data file to be printed.

The device control app is also provided by a peripheral device vendor, and is maintained and managed to be able to be downloaded to a computer from a predetermined server system called an "app store" that is provided by, for example, an OS vendor.

[Specific Driver]

Specific drivers 260 are printer drivers that support respective corresponding models of the printer 100. In the Plug-and-Play system employing the device ID 340, the specific driver 260 is a printer driver corresponding to model identification information (MDL).

[Class Driver]

Class drivers 270 are printer drivers that are common to a family or a class to which the printer 100 belongs. In the Plug-and-Play system employing the device ID 340, the class driver 270 is a printer driver corresponding to compatible identification information (CID). The class driver 270 may also be provided as an in-box driver with which the OS is bundled.

<Software Configuration of Server Computer>

Figure 5:
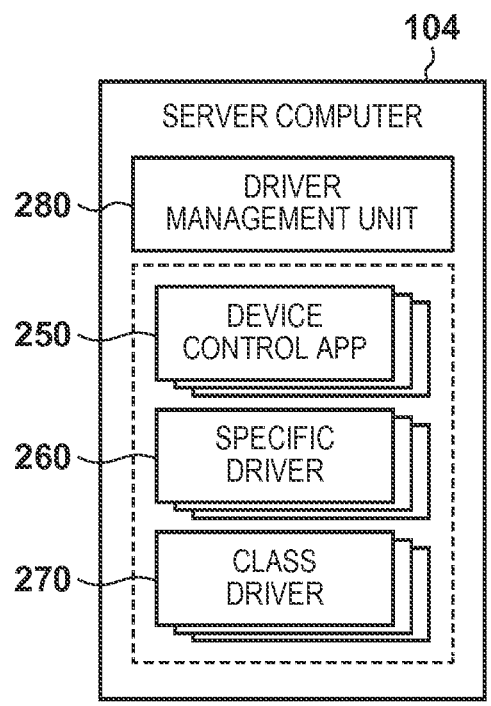
FIG. 5 is a block diagram showing a software configuration of a server computer 104.

FIG. 5 is a block diagram showing a software configuration of the server computer 104. The software configuration of the server computer 104 will be described with reference to FIG. 5. The server computer 104 includes a driver management unit 280 for responding to the driver search unit 230 of the client computer 102. The server computer 104 provides a device control app 250, a specific driver 260, and a class driver 270 through the driver management unit 280 to the client computer 102. Note that the server computer 104 stores up-to-date device control apps and printer drivers that are provided by printer vendors. Therefore, the up-to-date device control apps and printer drivers can be provided to the client computer 102.

<Software Configuration of Printer>

Figure 6:
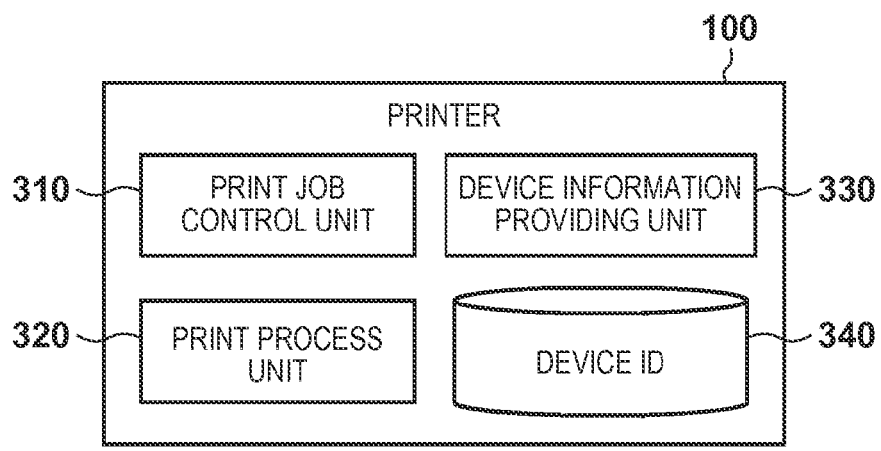
FIG. 6 is a block diagram showing a software configuration of the printer 100.

FIG. 6 is a block diagram showing a software configuration of the printer 100. The software configuration of the printer 100 will be described with reference to FIG. 6.

A print job control unit 310 performs a print job control to print received print data. A print process unit 320 executes an actual print process. A device information providing unit 330 provides the device ID 340 stored in the printer 100 in response to a request from the device ID obtaining unit.

<Configuration and Example of Device ID>

Figure 7:
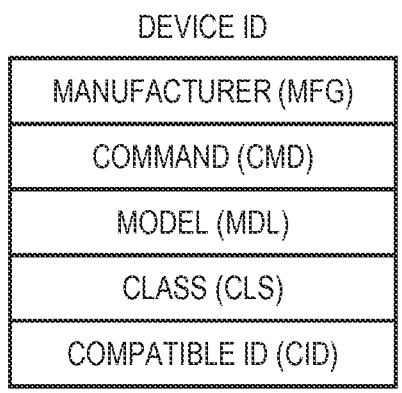
FIG. 7 is a diagram showing a configuration of a device ID 340.

FIG. 7 is a diagram showing a configuration and an example of the device ID 340. Firstly, a configuration and an example of the device ID 340 that are used in the present invention will be described with reference to FIG. 7. The device ID 340 is represented in the form of character string information, and includes the following main elements:

"MANUFACTURER" (hereinafter abbreviated to "MFG") indicating information about the manufacturer of the device;

"COMMAND SET" (hereinafter abbreviated to "CMD") indicating a command set supported by the device;

"MODEL" (hereinafter referred to as "MDL") indicating the model identification information of the device;

"CLASS" (hereinafter referred to as "CLS") indicating the class information of the device; and "COMPATIBLE ID" (hereinafter abbreviated to "CID") indicating the compatible identification information of a family or a class to which the device belongs.

Note that IEEE1284 specifies that it is necessary to provide MFG, MDL, and CMD, and it is not necessary to provide CLS and CID.

An example device ID is "MANUFACTURER: ABC; COMMAND SET:PCL;MODEL:M123;CLASS:PRINTER; COMPATIBILEID:Class 1;". A semi-colon (;) separates items. A colon (:) separates the name of an item from the value of the item. In this example, the device ID indicates a printer where the manufacturer is "ABC", the printer supports "PCL" as a command set, the model name is "M123". The device ID also indicates that the class of the device is "PRINTER", and the compatible identification information of the device is "Class 1" (the device is named "Class 1").

<Software Configuration of Driver Installer>

Figure 8:
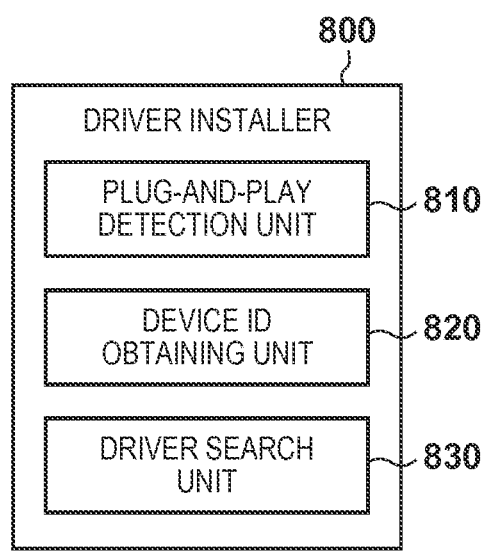
FIG. 8 is a block diagram showing a software configuration of a driver installer 800.

FIG. 8 is a block diagram showing a software configuration of the driver installer 800. The software configuration of the driver installer 800 will be described with reference to FIG. 8. A Plug-and-Play detection unit 810 detects the printer 100 that is connected through an interface, such as Universal Serial Bus (USB), Web Services on Devices (WSD), etc. A device ID obtaining unit 820 sends a device ID obtaining request to the printer 100 that is to be installed, to obtain the device ID. A driver search unit 830 searches for a device control app 250, a specific driver 260, and a class driver 270 that correspond to the obtained device ID. Note that the search range of the driver search unit 830 is assumed to be a predetermined server computer 104.

[Touchscreen UI and Desktop UI]

Figure 9:
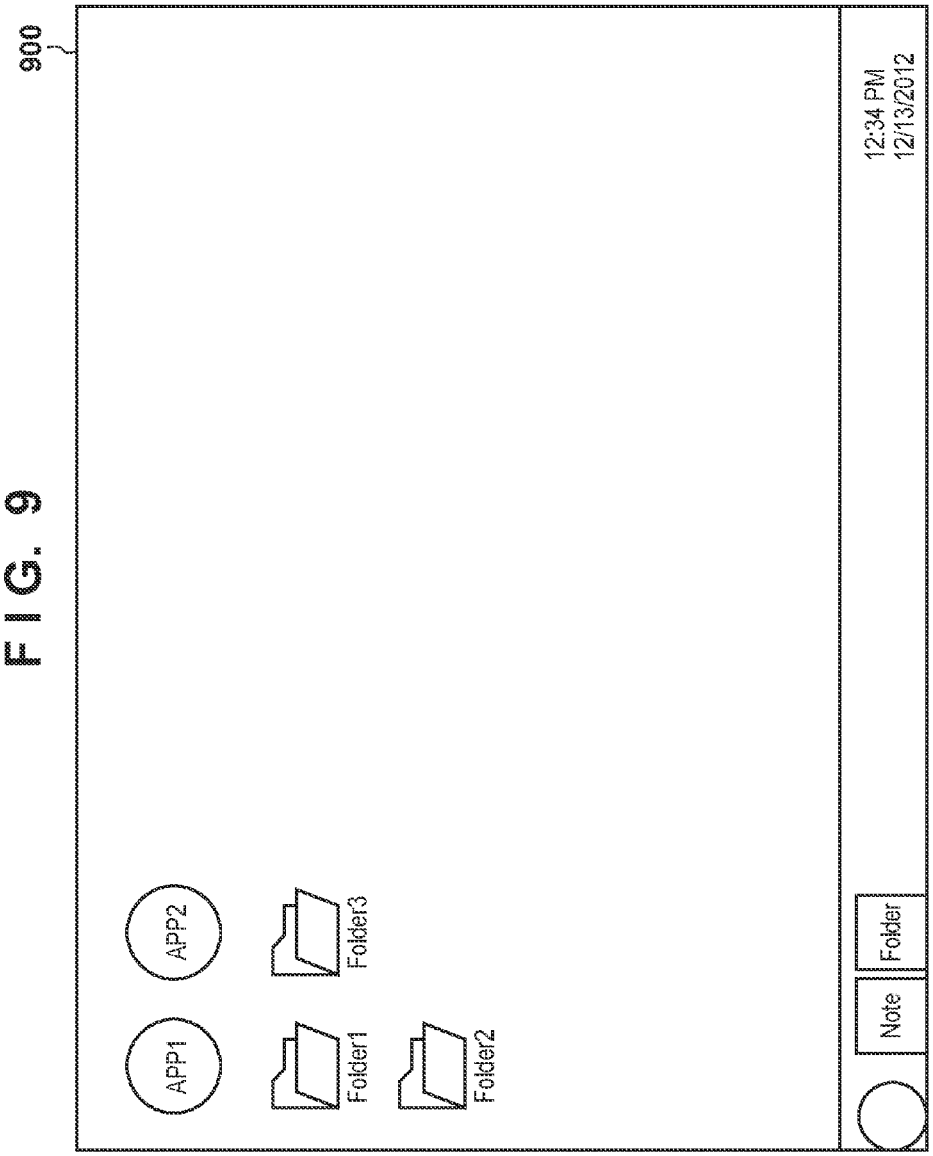
FIG. 9 is a diagram showing an example desktop UI 900.
Figure 10:
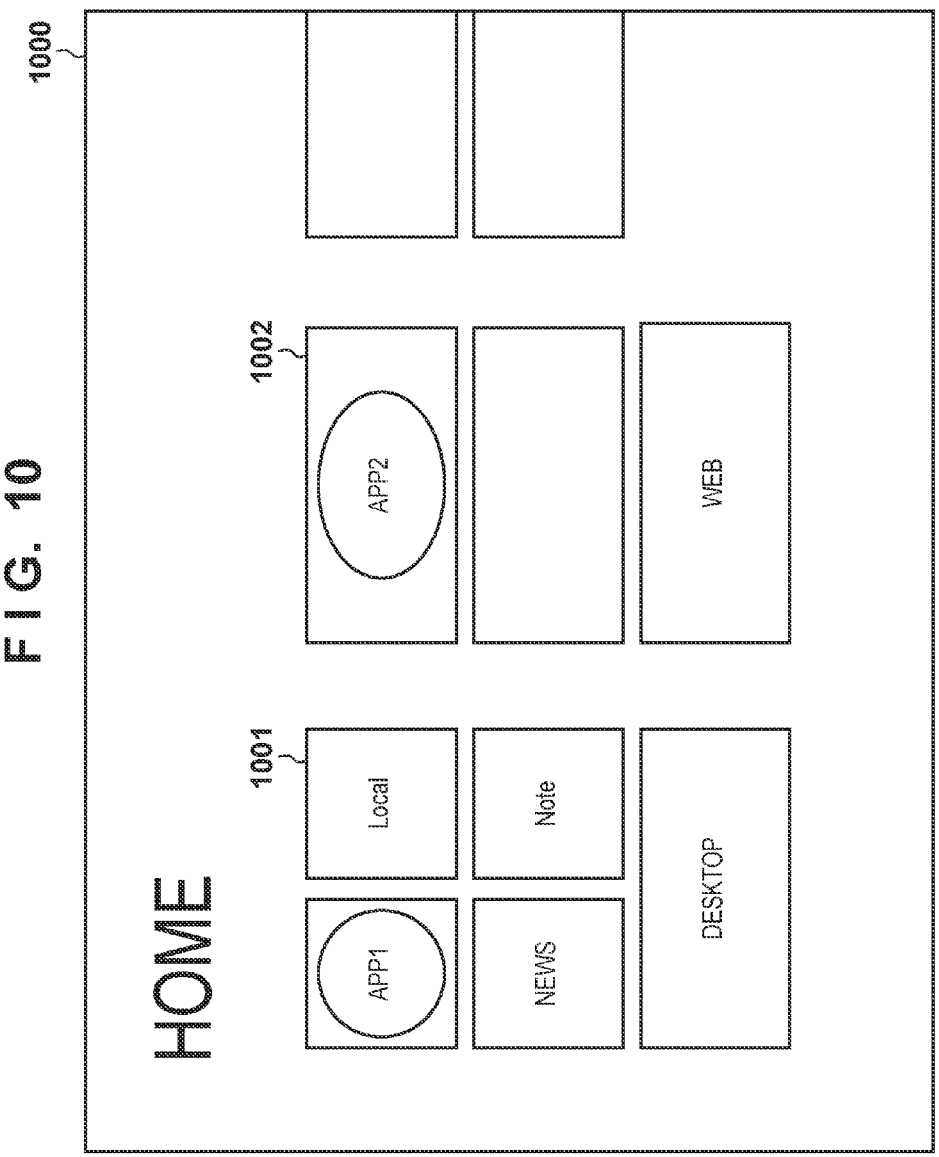
FIG. 10 is a diagram showing an example touchscreen UI 1000.

FIG. 9 shows an example of the desktop UI of this embodiment. FIG. 10 shows an example of the touchscreen UI of this embodiment. A touchscreen UI 1000 optimum for a touchscreen provides a button arrangement (e.g., buttons 1001 and buttons 1002) in a tile pattern that allows the user to operate easily using a finger. By touching each button, the user causes the computer to execute a function corresponding to the button, such as execution of an application program etc. There have been some operation systems that allow the user to manually switch a display from the touchscreen UI 1000 to a desktop UI 900.

On the other hand, the OS imparts compatibility to a printer driver designed for the desktop UI 900 so that the printer driver can be used even when there is a print request from an application for the touchscreen UI 1000. As a result, even in an environment of a new OS having the touchscreen UI 1000, the user can perform printing using a traditional printer driver that is produced for the desktop UI 900, which is a traditional UI environment.

However, when the UI of the traditional printer driver is displayed from the application for the touchscreen UI 1000, it is not easy to use or operate the UI. This is because, for touchscreen users, the UI of the traditional printer driver based on input operations using a mouse or a keyboard is complicated and is not easy to operate.

Figure 11:
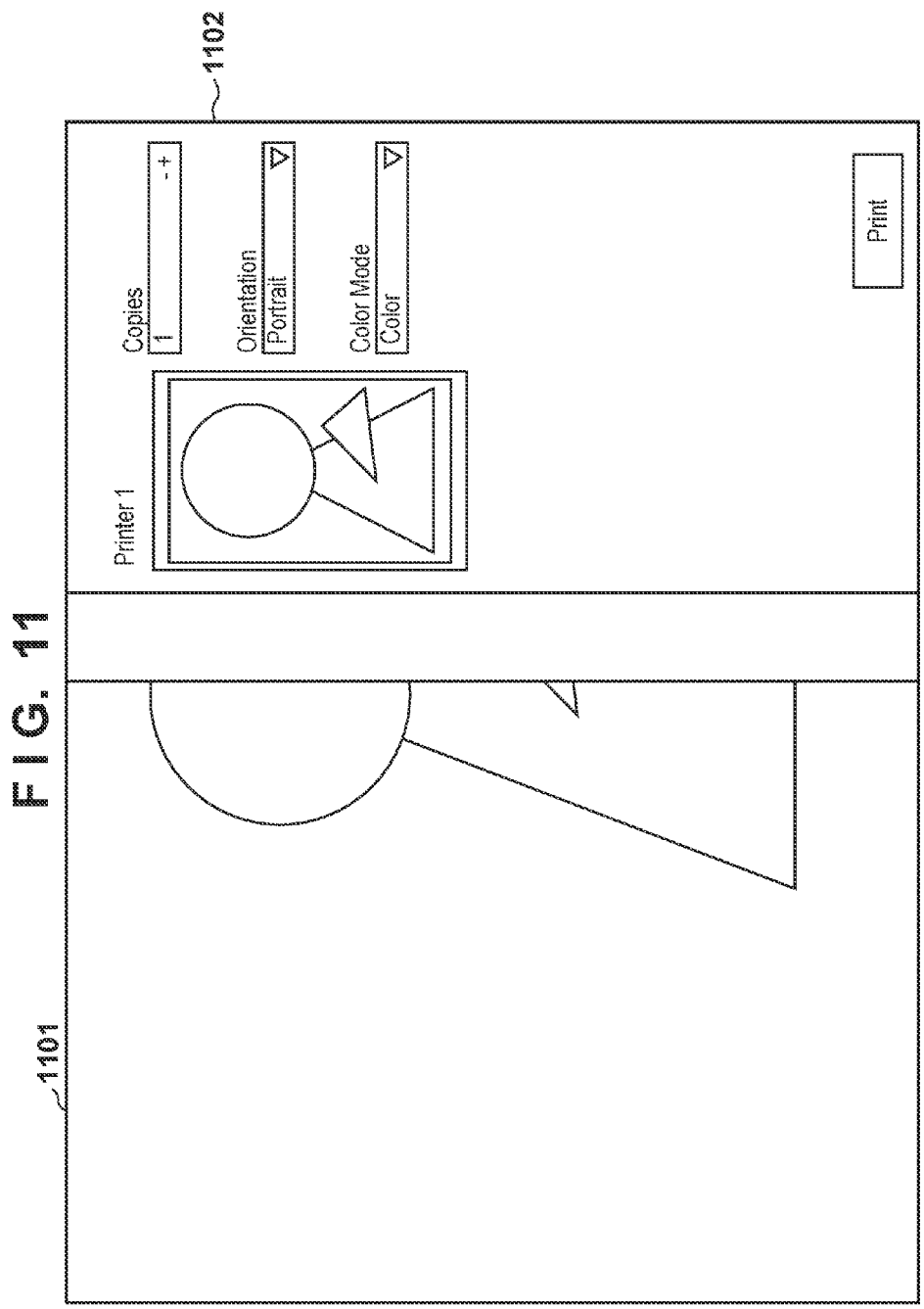
FIG. 11 is a diagram showing a UI 1101 of an application for a touchscreen UI and a UI 1102 automatically generated by an OS.

Therefore, instead of directly displaying the UI of the printer driver on the touchscreen UI 1000, the OS automatically generates a UI for specifying print settings, based on XML-format meta-data, thereby improving user-friendliness etc. FIG. 11 shows an example UI 1101 that is an application for the touchscreen UI 1000, and an example UI 1102 that is automatically generated by the OS based on XML-format meta-data, in this embodiment. The UI 1102 automatically generated based on XML-format meta-data allows the user to specify only settings for print style. In the UI 1102 of FIG. 11, the number of copies, the orientation of paper, and the color mode (color or black-and-white) can be specified.

[Installation Process of Device Control App and Printer Driver (Part 1)]

Figure 12:
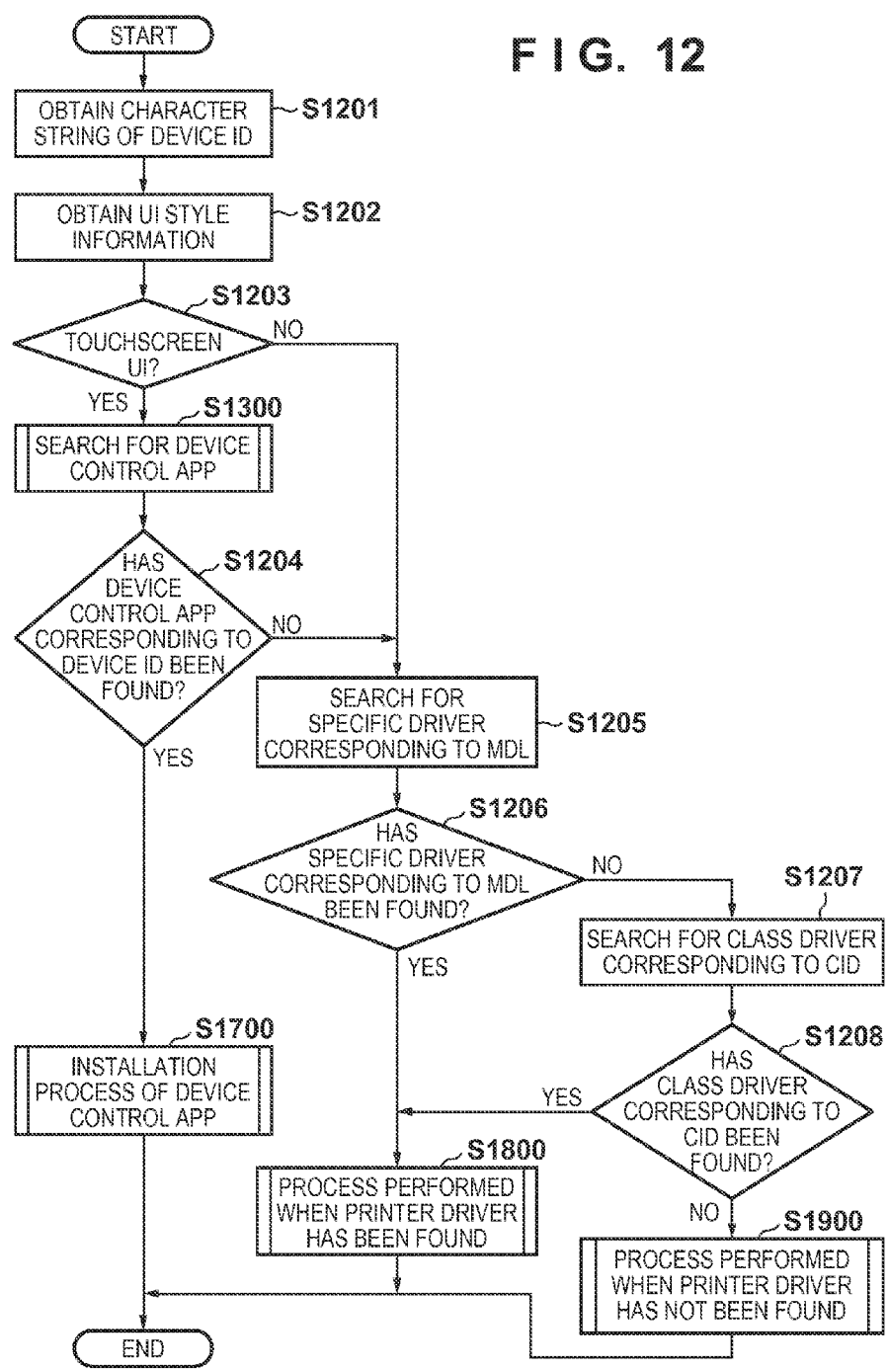

FIG. 12 shows a process flow of Plug and Play where a device control app 250, a specific driver 260, and a class driver 270 are objects to be searched for. The process of Plug and Play where a device control app 250, a specific driver 260, and a class driver 270 are objects to be searched for will be described with reference to FIG. 12.

Initially, the Plug-and-Play detection unit 210 of the client computer 102 detects when the printer 100 is connected through the connection medium 101, and the process of this Plug and Play is started.

The device ID obtaining unit 220 sends a request for obtaining the device ID 340 to the printer 100. In response to the obtaining request, the device information providing unit 330 of the printer 100 returns the device ID 340 to the device ID obtaining unit 220. The device ID obtaining unit 220 transfers model identification information (MDL) and compatible identification information (CID) contained in the obtained device ID 340 to the driver search unit 230 (step S1201).

In step S1202, the UI style obtaining unit 290 obtains UI style information indicating which of the touchscreen UI and the desktop UI the UI displayed on the display 10 of the client computer 102 is. If the information obtained in step S1202 indicates the touchscreen UI, control proceeds to step S1300, and if the information obtained in step S1202 indicates the desktop UI, control proceeds to step S1205 (step S1203).

In step S1300, the driver search unit 230 performs a device control app search process. The process of step S1300 will be described later with reference to FIG. 13. If a device control app 250 corresponding to the device ID 340 has been found in the search process of step S1300, control proceeds to step S1700, and otherwise, control proceeds to step S1205 (step S1204).

In step S1700, the driver installation process unit 240 performs a process of installing the device control app. The process of step S1700 will be described later with reference to FIG. 17.

In step S1205, the driver search unit 230 searches for a specific driver 260 corresponding to the model identification information (MDL) received from the device ID obtaining unit 220. If the specific driver 260 has been found in the search process of step S1205, control proceeds to step S1800, and otherwise, control proceeds to step S1207 (step S1206). The process of step S1800 will be described later with reference to FIG. 18.

In step S1206, if the specific driver 260 corresponding to the model identification information (MDL) has not been found, control proceeds to step S1207.

In step S1207, the driver search unit 230 searches for a class driver 270 corresponding to the compatible identification information (CID) received from the device ID obtaining unit 220. If compatible identification information (CID) is not described in the device ID 340, null information is received and therefore no matching class driver 270 is found.

If the class driver 270 has been found in the search process of step S1207, control proceeds to step S1800, and otherwise, control proceeds to step S1900 (step S1208). The process of step S1900 will be described later with respect to FIG. 19.

In the process flow of FIG. 12, it is determined whether or not the user interface of a computer to which a printer driver is to be installed is the touchscreen UI, and if the user interface is the touchscreen UI, a device control app is searched for with a higher priority. If the user interface is not the touchscreen UI or no matching device control app has been found, installation of a printer driver supporting the traditional user interface is tried.

[Details of Step S1300]

Figure 13:
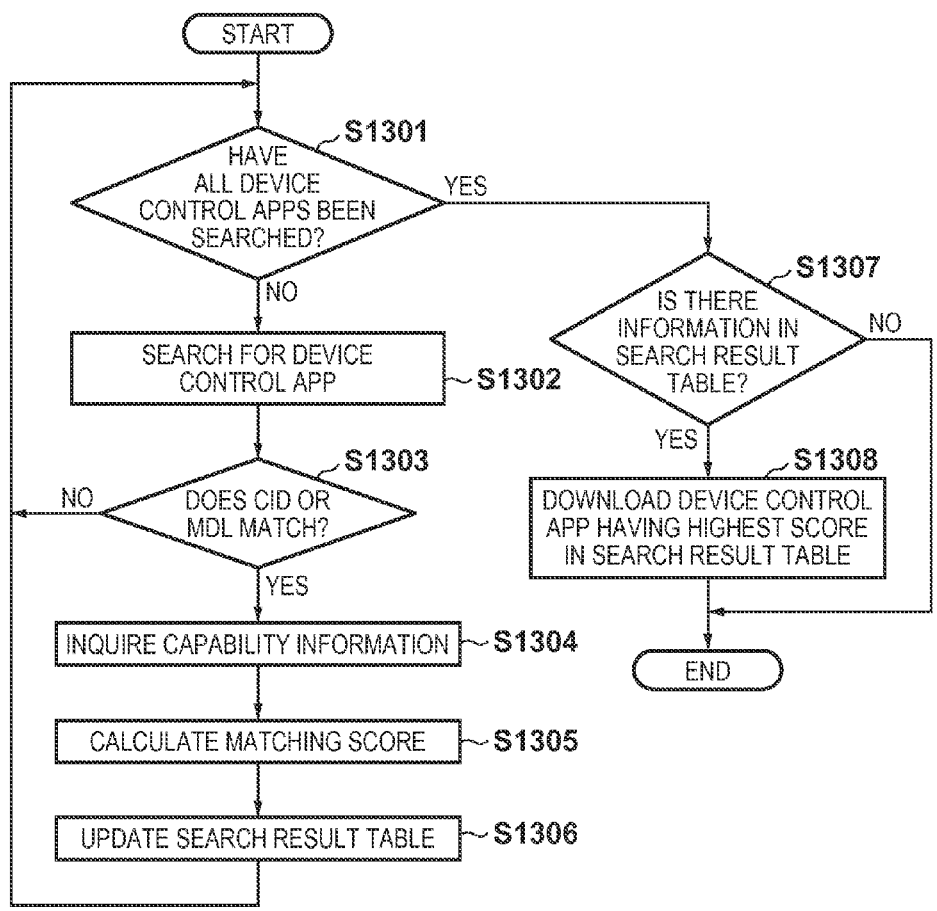

FIG. 13 is a flow of the process (step S1300) of searching for a device control app 250 optimum for the device ID 340. The search for the device control app 250 will be described with reference to FIG. 13.

In step S1301, if all device control apps in the server computer 104 have been searched, control proceeds to step S1307, and otherwise, control proceeds to step S1302. In step S1302, the driver search unit 230 searches for a device control app 250 corresponding to the received device ID 340. In the search for the device control app 250, device control apps stored in the server computer 104 are successively searched for a device control app corresponding to the model identification information (MDL) or the compatible identification information (CID). If the device control app 250 corresponding to the model identification information (MDL) or the compatible identification information (CID) has been found, control proceeds to step S1304, and otherwise, control proceeds to step S1301. By the above process, all device control apps in the server computer 104 are searched (step S1303).

In step S1304, the driver search unit 230 inquires information about a capability of the found device control app 250 of the driver management unit 280. The capability information of a device control app refers to information indicating whether or not a print function, such as an optional printer function (e.g., a stapler, a punch, etc.), a secure print function, a department management function, etc., can be available. For example, examples of the capability information of a device control app are as follows.

Device control app A: optional printer function=available; secure print function=available; department management function=not available, Device control app B: optional printer function=not available; secure print function=not available; department management function=not available, and Device control app C: optional printer function=not available; secure print function=available; department management function=not available.

In this example, for the device control app A, the optional printer function and the secure print function are available, and the department management function is not available. For the device control app B, none of the optional printer function, the secure print function, and the department management function is available. For the device control app C, the secure print function is available, and neither of the optional printer function and the department management function is available.

In step S1305, the driver search unit 230 calculates a matching score for the device control app 250. The matching score refers to a value indicating the degree of compatibility in terms of ability, which is calculated from the match/mismatch of model identification information (MDL) and compatible identification information (CID), and the capability value, of the device control app 250. FIG. 14 shows an example method for calculating the matching score. In this example, the matching score is calculated as the sum of the following points: 10 points if the device control app 250 matches model identification information (MDL); 5 points if the device control app 250 matches compatible identification information (CID); and 10 points if the device control app 250 has a function corresponding to the capability information (10 points per function). For example, a device control app A of FIG. 14 matches model identification information (MDL) and has two functions, and therefore, its matching score is 30 points. Similarly, a device control app B has 5 points, and a device control app C has 25 points. Therefore, the device control app A has the highest capability value.

In step S1306, the driver search unit 230 saves the calculated matching score and information about the device control app into a search result table. The search result table stores, for example, an app name, the match/mismatch of model identification information (MDL) and compatible identification information (CID), and capability information (capability value) as information about a device control app, and also stores the calculated matching score in association with the app.

In step S1307, the driver search unit 230 references the search result table, and if there is information in the search result table, control proceeds to step S1308, and otherwise, it is determined that no suitable device control app has been found, and the process is ended.

In step S1308, the driver search unit 230 downloads the device control app 250 having the highest matching score of the search result table from the server computer 104 to the client computer 102. Thereafter, the driver search unit 230 transfers the app name of the device control app 250 as a search result to the driver installation process unit 240, and the process is ended.

[Installation Process of Device Control App and Printer Driver (Part 2)]

Figure 15:
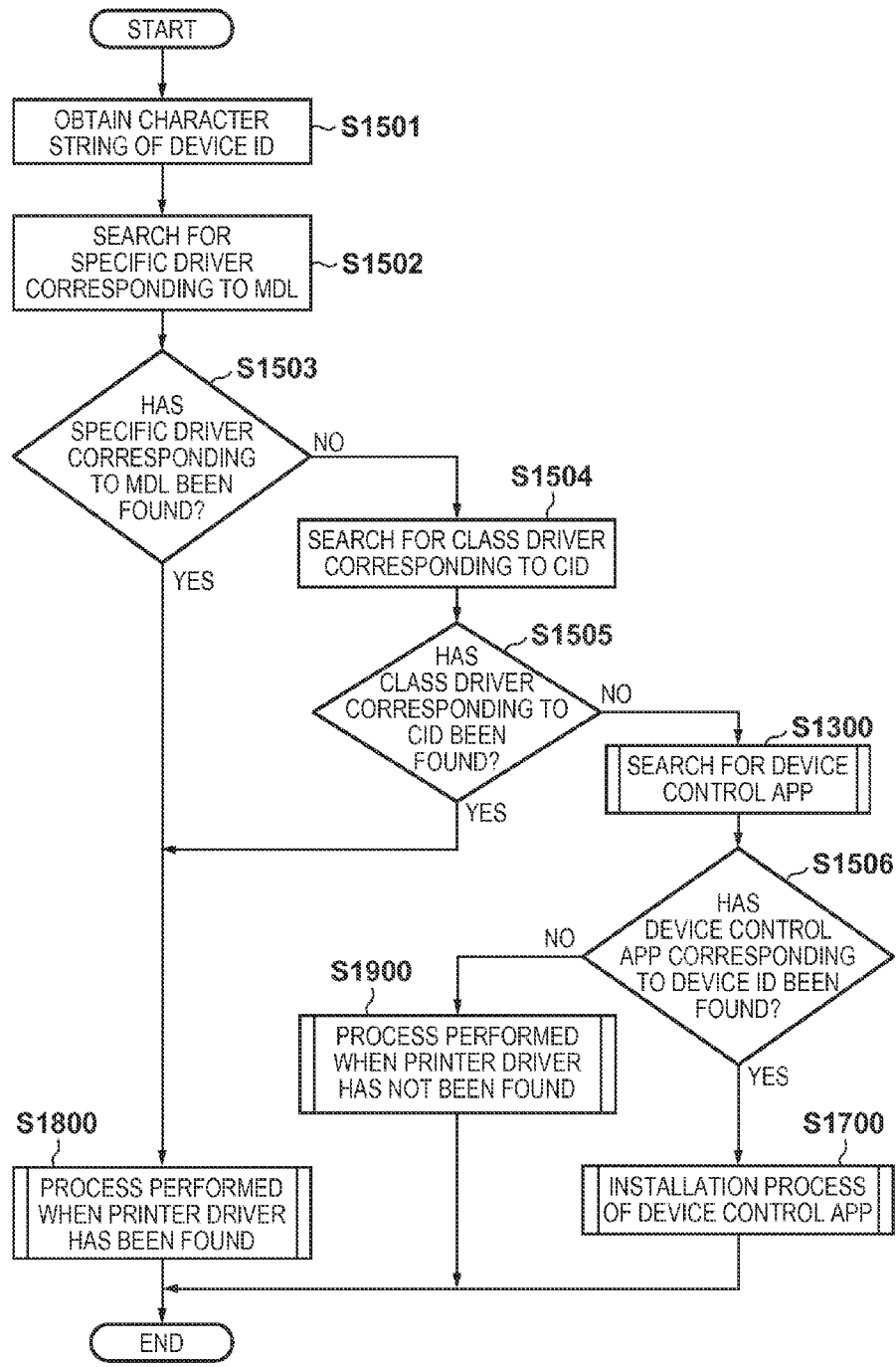

FIG. 15 shows another process flow of Plug and Play where a device control app 250, a specific driver 260, and a class driver 270 are objects to be searched for. This process may replace that of FIG. 12. The process flow of FIG. 15 shows a process of a Plug and Play system in which a device control app 250 is added to objects to be searched for in the traditional Plug and Play process.

Initially, the Plug-and-Play detection unit 210 of the client computer 102 detects when the printer 100 is connected through the connection medium 101, and this Plug and Play process is started.

The device ID obtaining unit 220 sends a request for obtaining the device ID 340 to the printer 100. In response to the obtaining request, the device information providing unit 330 of the printer 100 returns the device ID 340 to the device ID obtaining unit 220. The device ID obtaining unit 220 transfers model identification information (MDL) and compatible identification information (CID) contained in the obtained device ID 340 to the driver search unit 230 (step S1501).

In step S1502, the driver search unit 230 searches for a specific driver 260 corresponding to the model identification information (MDL) received from the device ID obtaining unit 220. If the specific driver 260 has been found in the search process of step S1502, control proceeds to step S1800, and otherwise, control proceeds to step S1504 (step S1503). The process of step S1800 will be described later with reference to FIG. 18.

If the specific driver 260 corresponding to the model identification information (MDL) has not been found in step S1503, control proceeds to step S1504.

In step S1504, the driver search unit 230 searches for a class driver 270 corresponding to the compatible identification information (CID) received from the device ID obtaining unit 220. If compatible identification information (CID) is not described in the device ID 340, null information is received and therefore no matching class driver 270 is found.

If the class driver 270 has been found in the search process of step S1504, control proceeds to step S1800, and otherwise, control proceeds to step S1300 (step S1505). In step S1300, the above process of FIG. 13 is performed.

If the device control app 250 corresponding to the device ID 340 has been found in the search process of step S1300, control proceeds to step S1700, and otherwise, control proceeds to step S1900 (step S1506). The process of step S1700 will be described later with reference to FIG. 17. The process of step S1900 will be described later with reference to FIG. 19.

In the process flow of FIG. 15, a printer driver corresponding to a traditional user interface is first searched for. If no such a printer driver has been found, search and installation of a device control app are tried. Therefore, the level of search priority of a device control app is low compared to FIG. 15.

[Installation Process of Device Control App and Printer Driver (Part 3)]

Figure 16:
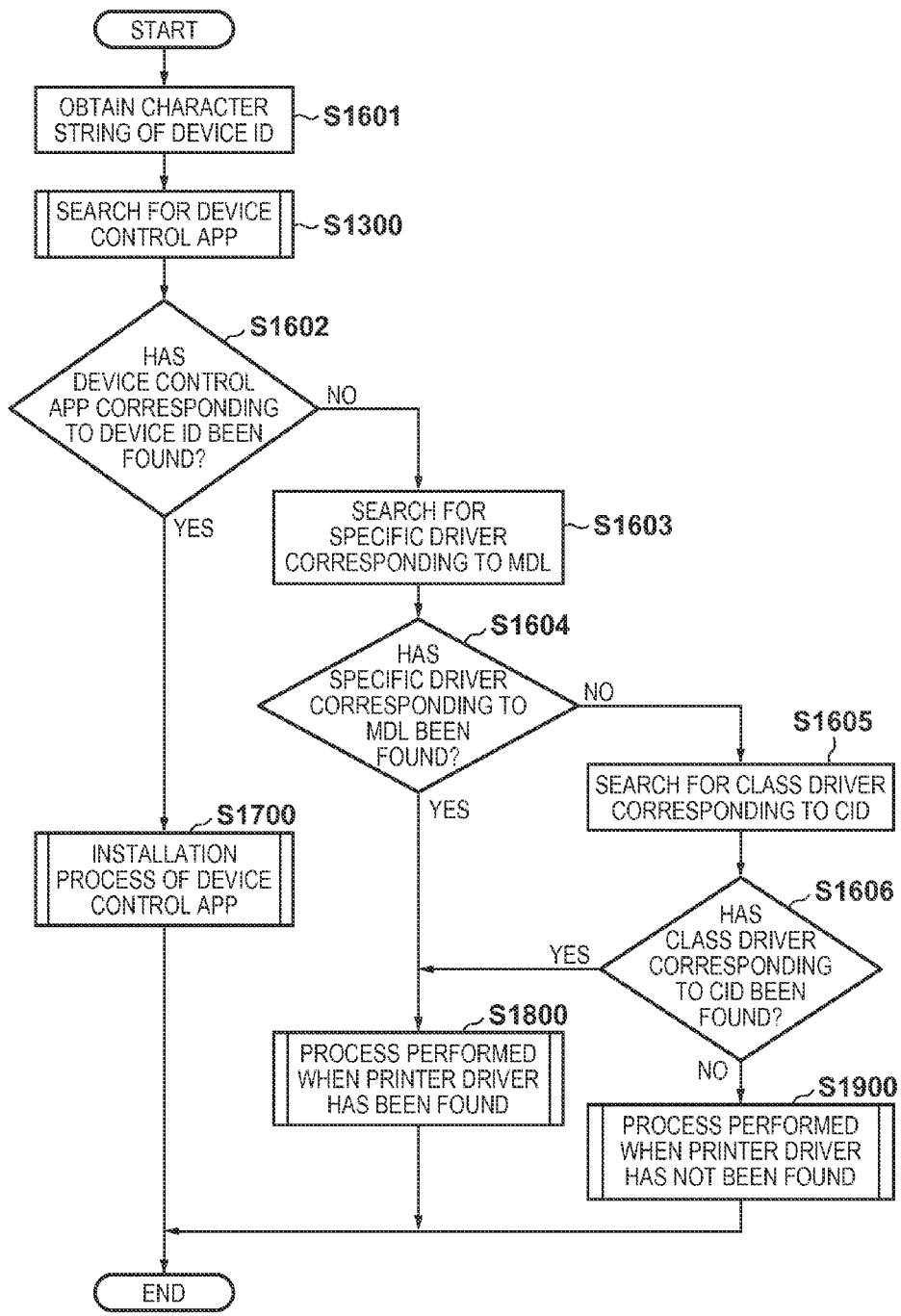

FIG. 16 is a flow of an installation process of the driver installer 800 where a device control app 250, a specific driver 260, and a class driver 270 are objects to be searched for. In this process, the Plug and Play system of the OS is not used. Therefore, a system for installing a printer driver and a device control app that are optimum for the touchscreen UI or the desktop UI can be provided without changing the Plug and Play system of the OS. Therefore, the process flow of FIG. 16 can coexist with those of FIGS. 12 and 15, and for example, may be performed when an installer provided by a printer vendor is manually activated to try to install a printer driver. Therefore, for example, the process flow of FIG. 16 is executed in response to an instruction for manual installation, such as activation of an installer etc. The process of the driver installer 800 where a device control app 250, a specific driver 260, and a class driver 270 are searched for will be described with reference to FIG. 16.

Initially, a Plug-and-Play detection unit 820 of the driver installer 800 detects when the printer 100 is connected through the connection medium 101, and the installation process is started.

The device ID obtaining unit 820 sends a request for obtaining the device ID 340 to the printer 100. In response to the obtaining request, the device information providing unit 330 of the printer 100 returns the device ID 340 to the device ID obtaining unit 820. The device ID obtaining unit 820 transfers model identification information (MDL) and compatible identification information (CID) contained in the obtained device ID 340 to the driver search unit 830 (step S1601).

In step S1300, the device control app search process of FIG. 13 is performed. In the process in this case, the device control app search process is performed by the driver search unit 830 included in the driver installer 800. If a device control app 250 corresponding to the device ID 340 has been found in the search process of step S1300, control proceeds to step S1700, and otherwise, control proceeds to step S1603 (step S1602). The process of step S1700 will be described later with reference to FIG. 17.

In step S1603, the driver search unit 830 searches for a specific driver 260 corresponding to the model identification information (MDL) received from the device ID obtaining unit 820. If the specific driver 260 has been found in the search process of step S1603, control proceeds to step S1800, and otherwise, control proceeds to step S1605 (step S1604). The process of step S1800 will be described later with reference to FIG. 18.

If the specific driver 260 corresponding to the model identification information (MDL) has not been found in step S1604, control proceeds to step S1605.

In step S1605, the driver search unit 830 searches for a class driver 270 corresponding to the compatible identification information (CID) received from the device ID obtaining unit 820. When compatible identification information (CID) is not described in the device ID 340, null information is received and therefore no matching class driver 270 is found.

If the class driver 270 has been found in the search process of step S1605, control proceeds to step S1800, otherwise, control proceeds to step S1900 (step S1606). The process of step S1900 will be described later with reference to FIG. 19.

According to the above process flow, a suitable device control app is first searched for in response to an instruction to install a printer driver, and if the device control app is found, the device control app is installed. Therefore, when the manual installation of a printer driver is tried in a computer used in the touchscreen UI environment, a device control app can be installed with a higher priority, and there is no need to change the process flow of Plug and Play.

[Installation Process of Device Control App (S1700)]

Figure 17:
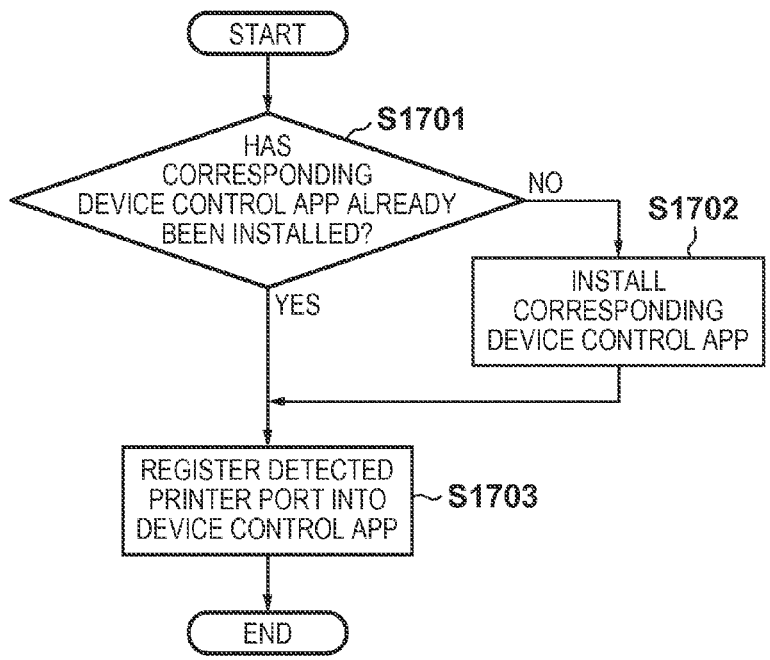
FIG. 17 is a diagram showing a flow of a process (step S1700) that is performed when a device control app has been found.

FIG. 17 is a flow of a process (step S1700) that is performed when a device control app has been found. The process that is performed when a device control app has been found will be described with reference to FIG. 17.

The driver installation process unit 240 checks whether or not a device control app 250 that is to be installed according to the instruction has already been installed in the client computer 102. For example, a list of names of device control apps installed in the client computer 102 is obtained. By checking whether or not the name of a device control app that is to be installed according to the instruction is on the list, it can be determined whether or not the device control app has already been installed (step S1701).

If the device control app has not been installed in the client computer 102, the driver installation process unit 240 installs the device control app into the client computer 102 (step S1702). Specifically, the device control app is downloaded from the server computer 104, and necessary installation processes such as registration to a registry etc. are performed. On the other hand, if the device control app has been installed in the client computer 102, control proceeds to step S1703.

In step S1703, the driver installation process unit 240 registers a port at which the Plug-and-Play detection unit 210 has detected connection of the printer 100, as an output port, into the device control app 250. Here, the registered port is registered as a default output port in the device control app 250. The installed device control app 250 is displayed as a tile, such as a tile 1002 shown in FIG. 10. Note that when a print driver is retrieved according to the manual installation process of FIG. 16, the driver installation process unit 240 registers a designated port as an output port instead of the port at which connection of the printer 100 has been detected by the Plug-and-Play detection unit 210.

[Driver Installation Process (S1800)]

Figure 18:
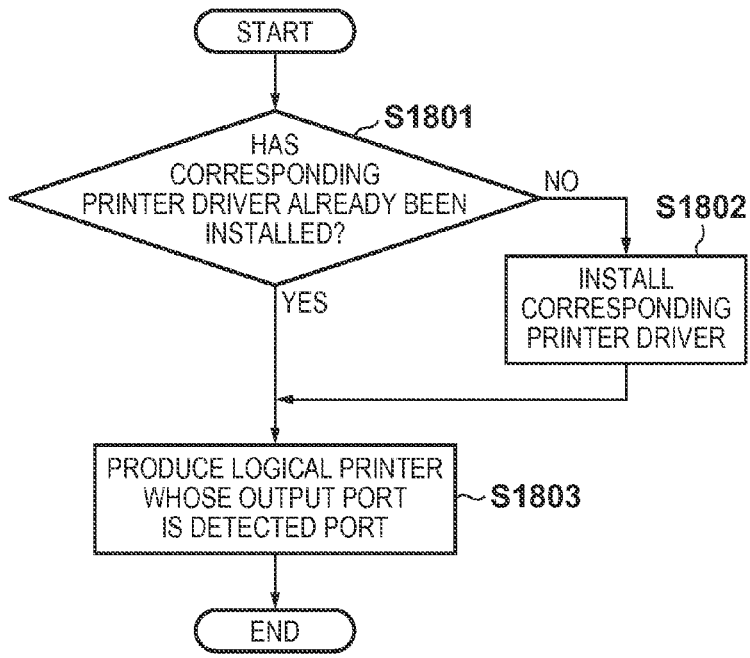
FIG. 18 is a diagram showing a flow of a process (step S1800) that is performed when a printer driver has been found.

FIG. 18 shows a flow of a process that is performed when a specific driver 260 or a class driver 270 has been found (step S1800). The process that is performed when a printer driver has been found will be described with reference to FIG. 18. The driver installation process unit 240 checks whether or not a printer driver that is to be installed according to the instruction has already been installed in the client computer 102. For example, a list of names of printer drivers installed in the client computer 102 is obtained. By checking whether or not the name of a printer driver that is to be installed according to the instruction is on the list, it can be determined whether or not the printer driver has already been installed (step S1801).

If the printer driver has not been installed in the client computer 102, the driver installation process unit 240 installs the printer driver into the client computer 102 (step S1802).

In this case and also when the printer driver has already been installed by the process of step S1801, the driver installation process unit 240 produces a logical printer whose output port is a port at which the Plug-and-Play detection unit 210 has detected connection of the printer 100 (step S1803). Here, the logical printer refers to a logical object for using a printer driver, which is referenced as a "printer" when a print application performs printing. Note that a logical printer has one print queue. Thus, a printer driver can be installed.

[Process Performed If Driver Has Not Been Found (step S1900)]

Figure 19:
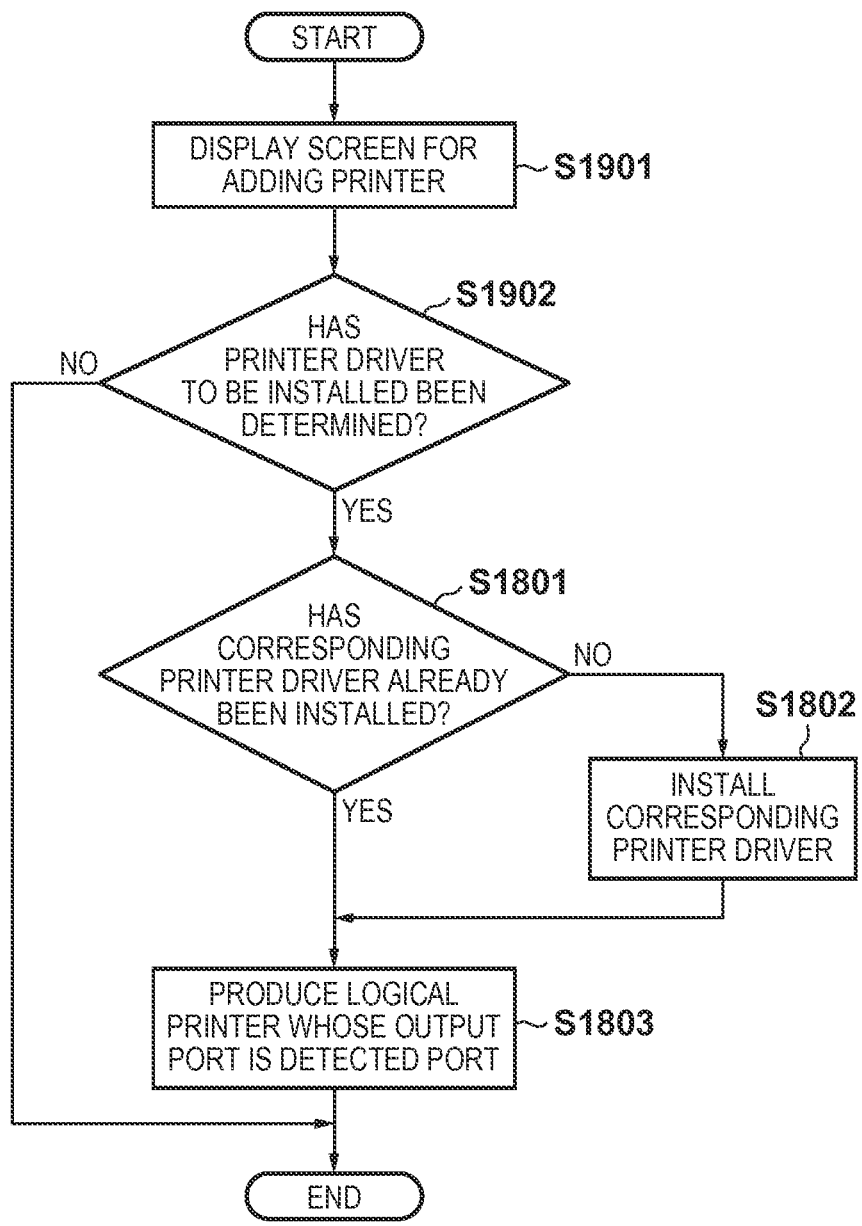
FIG. 19 is a diagram showing a flow of a process (step S1900) that is performed when a printer driver has not been found.
Figure 20:
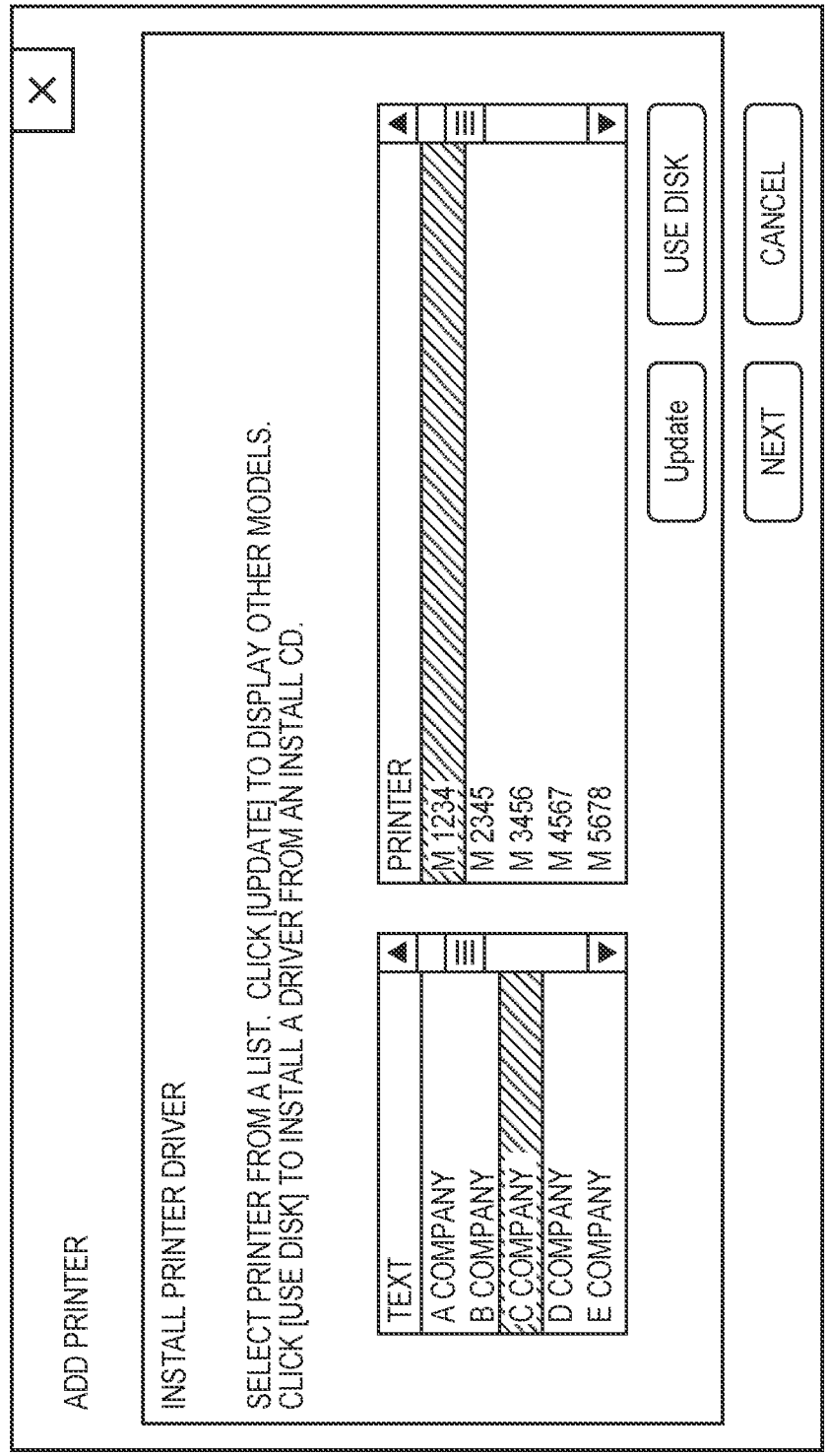
FIG. 20 is a diagram showing an example screen for adding a printer.

FIG. 19 shows a flow of a process (step S1900) that is performed when a specific driver 260 or a class driver 270 has not been found. The process performed when a printer driver has not been found will be described with reference to FIG. 19. The driver installation process unit 240 displays a dialog into which the user can enter an input in order to add a logical printer (step S1901). FIG. 20 is a diagram showing an example printer addition screen displayed in step S1901. Such a dialog is displayed, to which the user can enter an input in order to designate a printer driver that is to be installed.

Referring back to FIG. 19, it is determined whether or not a printer driver to be installed has been designated (step S1902).

If the printer driver to be installed has not been designated, the process is ended without installing a printer driver or adding a printer.

If the user has designated the printer driver to be installed, the same processes as those of steps S1801, S1802, and S1803 of FIG. 18 are performed to install a printer driver and add a printer.

(Second Embodiment)

An embodiment will be described in which a peripheral device is a multi-functional peripheral, which has the functionality of a printer, a fax machine, a scanner, and the like. Note that this embodiment has a system configuration, a printer driver installation process, etc. which are similar to those of the first embodiment.

In this embodiment, a printer driver or a device control app is installed, depending on the value of class information (CLS) contained in the device ID 340 detected during Plug and Play. For example, in the case of a fax driver supporting a multi-functional peripheral having a faxing function, a dialog for designating a fax destination is inevitably popped up during printing. Note that, as described above, a pop-up UI that prompts the user to enter an input has a functional limitation, such as necessity of displaying on the desktop UI, which is a traditional UI environment, etc. Therefore, when the class information (CLS) contained in the device ID 340 indicates "MODEM" that indicates the fax class, then if a device control app that does not have the above functional limitation is installed, the user's convenience can be improved. On the other hand, when the class information (CLS) contained in the device ID 340 indicates "PRINTER" that indicates the print class, a printer driver is installed with a higher priority. This is because a specific driver is generally functionally superior, in many points, to a class driver and a device control app.

Figure 21:
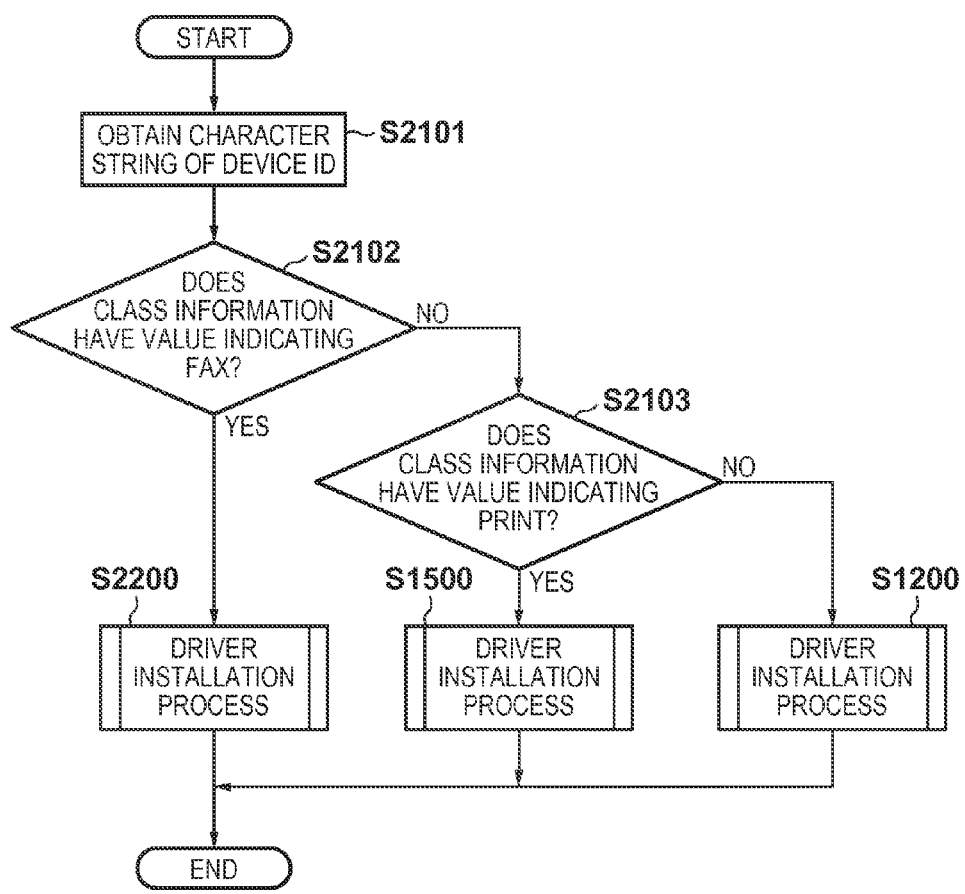
FIG. 21 is a diagram showing a flow of a process of changing installation processes using class information (CLS) contained in a device ID 340.

FIG. 21 shows a flow of a process of changing installation processes, depending on class information (CLS) contained in the device ID 340. Initially, the Plug-and-Play detection unit 210 of the client computer 102 detects when the printer 100 is connected through the connection medium 101, and the process is started.

The device ID obtaining unit 220 sends a request for obtaining the device ID 340 to the printer 100. In response to the obtaining request, the device information providing unit 330 of the printer 100 returns the device ID 340 to the device ID obtaining unit 220. The device ID obtaining unit 220 transfers model identification information (MDL), compatible identification information (CID), and class information (CLS) contained in the obtained device ID 340 to the driver search unit 230 (step S2101). If the class information (CLS) obtained by the process of step S2101 has a value indicating "fax," the detected device may be a multi-functional peripheral, and control proceeds to step S2200, and otherwise, control proceeds to step S2103 (step S2102). In step S2200, the driver installation process unit 240 tries to search for and install a device control app or a printer driver corresponding to the model identification information (MDL) and the compatible identification information (CID). The process of step S2200 will be described later with reference to FIG. 22.

If the class information (CLS) obtained in step S2101 has a value indicating "print" in step S2103, control proceeds to step S1500, and otherwise, control proceeds to step S1200 (step S2103). The above process of FIG. 15 is performed in step S1500. In step S1200, the above process of FIG. 12 is performed. In this flow, in step S2101, the model identification information (MDL) and the compatible identification information (CID) that are contained in the device ID 340 are transferred to the driver search unit 230. Therefore, the processes of step S1201 of FIG. 12 and step S1501 of FIG. 15 can be removed. In the process flow of FIG. 15, a specific driver is first searched for with the highest priority. If no suitable specific driver has been found, a class driver is next searched for. If no suitable class driver has been found, a device control app is finally searched for. If any driver or app has been found, the driver or app is installed. In the process flow of FIG. 12, in the case of the touchscreen UI, a device control app is first searched for with the highest priority. If no suitable device control app has been found or in the case of the traditional user interface, a specific driver is next searched for. If no suitable specific driver has been found, a class driver is finally searched for. If any driver or app has been found, the driver or app is installed.

[Installation Process of Device Control App or Printer Driver (S2200)]

Figure 22:
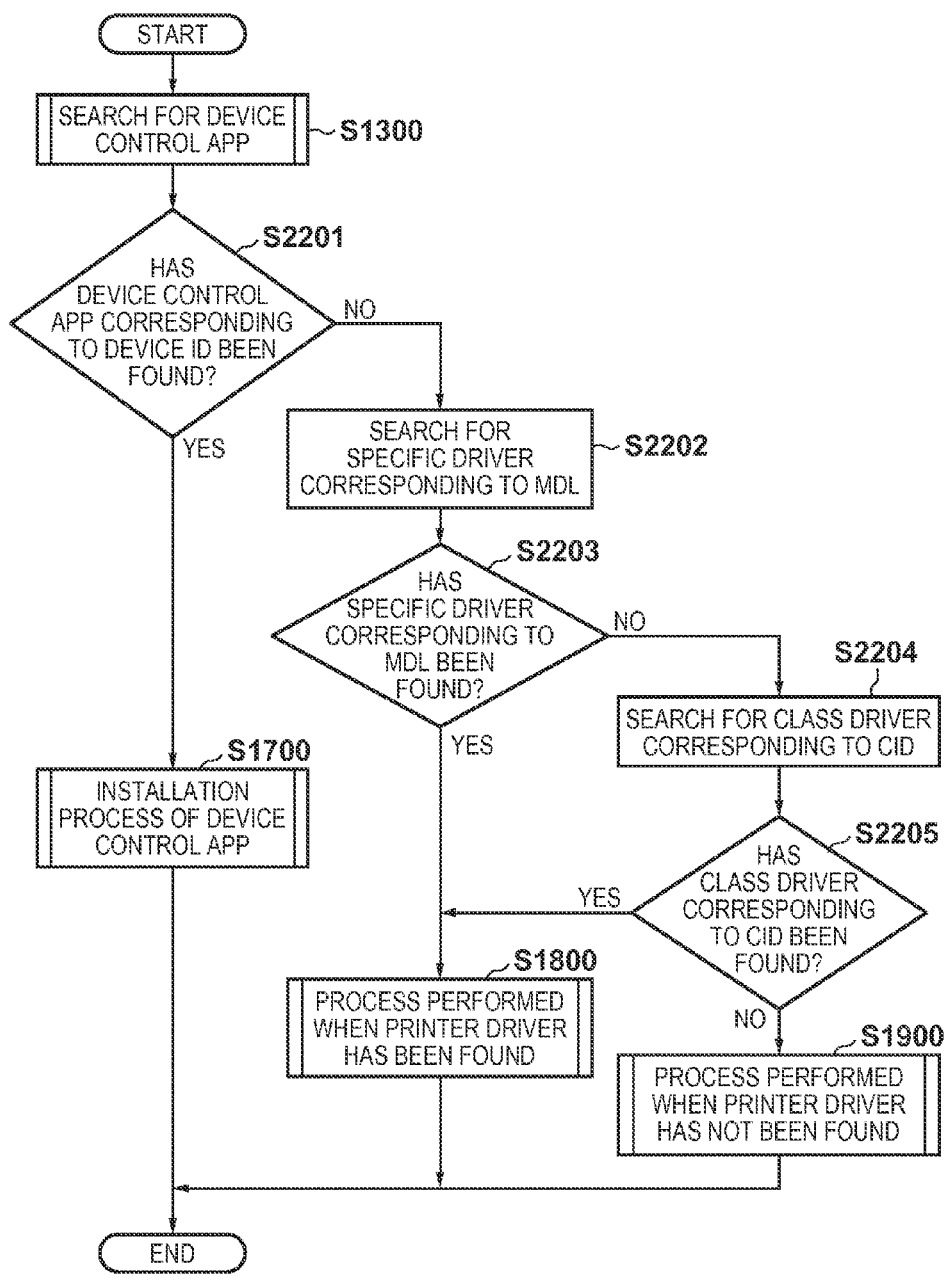
FIG. 22 is a diagram showing a flow of a search process and an installation process of a device control app or a printer driver corresponding to model identification information (MDL) and compatible identification information (CID).

FIG. 22 shows a flow of a search process and an installation process of a device control app or a printer driver corresponding to model identification information (MDL) and compatible identification information (CID).

In step S1300, the driver search unit 230 first performs a process of searching for a device control app supporting the detected device. The above process of FIG. 13 is performed in step S1300. If a device control app 250 corresponding to the device ID 340 has been found in the search process of step S1300, control proceeds to step S1700, and otherwise, control proceeds to step S2202 (step S2201). In step S1700, the driver installation process unit 240 performs a device control app installation process. The above process of FIG. 17 is performed in step S1700. Specifically, if the detected peripheral device is a multi-functional peripheral and there is a suitable device control app, the device control app is installed.

In step S2202, the driver search unit 230 searches for a specific driver 260 corresponding to the model identification information (MDL) received from the device ID obtaining unit 220. If the specific driver 260 has been found in the search process of step S2202, control proceeds to step S1800, and otherwise, control proceeds to step S2204 (step S2203). The above process of FIG. 18 is performed in step S1800.

If the specific driver 260 corresponding to the model identification information (MDL) has not been found in step S2202, control proceeds to step S2204.

In step S2204, the driver search unit 230 searches for a class driver 270 corresponding to the compatible identification information (CID) received from the device ID obtaining unit 220. If compatible identification information (CID) is not described in the device ID 340, null information is received and therefore no matching class driver 270 is found.

If the class driver 270 has been found in the search process of step S2204, control proceeds to step S1800, and otherwise, control proceeds to step S1900 (step S2205). The above process of FIG. 19 is performed in step S1900.

According to the above process flow, a device control app supporting a multi-functional peripheral can be installed with a higher priority.

In the case of a multi-functional peripheral, which is a peripheral device having the functionality of a printer, a fax machine, a scanner, and the like, a plurality of device IDs 340 may be detected during Plug and Play. In this case, the installation process of FIG. 21 is performed for each detected device ID, whereby a printer driver or a device control app that is suitable for each device ID can be installed.

According to the above embodiment, a simple system for installing a printer driver or a device control app optimum for the touchscreen UI or the desktop UI is provided, whereby the user's convenience can be improved.

The above embodiment is directed to the Windows (registered trademark) OS. However, even in other operation systems (e.g., the Mac OS), if the present invention is applied to systems (e.g., Bonjour) that are supported by these operation systems and have the same function as that of the Plug-and-Play system, similar advantages can be provided.

Moreover, the present invention encompasses systems configured by suitably combining the above embodiments, and functions of these systems.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-078988, filed Apr. 4, 2013 which is hereby incorporated by reference herein in its entirety.

What is claimed is:

1. An information processing apparatus in which an operating system (OS) is executed that provides a first user interface (UI) environment and a second UI environment different from the first UI environment, the information processing apparatus comprising:
    a first obtaining unit configured to obtain identification information of a peripheral device connected to a communication network, from the peripheral device; and
    a second obtaining unit configured to obtain a device control application for controlling the peripheral device, from a service that manages applications operable in the first UI environment, using the identification information of the peripheral device if the identification information of the peripheral device has been obtained by the first obtaining unit when the first UI environment is provided by the OS and, wherein the obtained device control application is different from the OS and a device driver,
    wherein each application operating on the OS is created depending on any one of the first UI environment and the second UI environment, and switching between the first UI environment and the second UI environment can be performed according to control by the OS,
    wherein at least one processor functions as at least one of the units,
    wherein the second obtaining unit, when a device control application corresponding to the identification information is not obtained, obtains a device driver corresponding to the identification information by searching an area to be searched for a device driver,
    wherein the second obtaining unit, if the identification information of the peripheral device has been obtained by the first obtaining unit when the second UI environment is provided by the OS, obtains a device driver corresponding to the identification information by searching an area to be searched for a device driver,
    wherein the first UI environment is more suitable for an operation on a touchscreen than the second UI environment, and wherein the second UI environment is provided to maintain compatibility with an OS having a version earlier than that of the OS.

2. The information processing apparatus according to claim 1, wherein
    the identification information includes model identification information and compatible identification information.

3. The information processing apparatus according to claim 1, wherein
    the area to be searched for a device driver includes a storage area of the information processing apparatus for managing a device driver and a storage area provided by an external server.

4. The information processing apparatus according to claim 1, wherein
    the second obtaining unit obtains, of a plurality of device control applications corresponding to the identification information, a device control application having a highest capability value calculated based on a function or functions provided by the device control application.

5. The information processing apparatus according to claim 4, wherein a capability value is calculated based on whether or not a device control application matches the identification information and a number of functions provided by the device control application.

6. The information processing apparatus according to claim 1, wherein
when the peripheral device is added to the communication network, the first obtaining unit obtains the identification information of the peripheral device as a function of the OS.

7. The information processing apparatus according to claim 1, wherein
when an installer for a device driver is activated, the first obtaining unit obtains the identification information of the peripheral device.

8. The information processing apparatus according to claim 1, wherein
the peripheral device is a printer.

9. A method for controlling an information processing apparatus in which an operating system (OS) is executed that provides a first user interface (UI) environment and a second UI environment different from the first UI environment, the method comprising:
first obtaining identification information of a peripheral device connected to a communication network, from the peripheral device; and
second obtaining a device control application for controlling the peripheral device, from a service that manages applications operable in the first UI environment, using the identification information of the peripheral device if the identification information of the peripheral device has been obtained when the first UI environment is provided by the OS, wherein the obtained device control application is different from the OS and a device driver,
wherein each application operating on the OS is created depending on any one of the first UI environment and the second UI environment, and switching between the first UI environment and the second UI environment can be performed according to control by the OS,
wherein in the second obtaining, when a device control application corresponding to the identification information is not obtained, a device driver corresponding to the identification information is obtained by searching an area to be searched for a device driver,
wherein in the second obtaining, if the identification information of the peripheral device has been obtained by the first obtaining when the second UI environment is provided by the OS, a device driver corresponding to the identification information is obtained by searching an area to be searched for a device driver,
wherein the first UI environment is more suitable for an operation on a touchscreen than the second UI environment, and wherein the second UI environment is provided to maintain compatibility with an OS having a version earlier than that of the OS.

10. The method according to claim 9, wherein
the identification information includes model identification information and compatible identification information.

11. The method according to claim 9, wherein
the area to be searched for a device driver includes a storage area of the information processing apparatus for managing a device driver and a storage area provided by an external server.

12. The method according to claim 9, wherein
when a peripheral device is added to the communication network, the identification information of the peripheral device is obtained as a function of the OS.

13. The method according to claim 9, wherein
when an installer for a device driver is activated, the identification information of the peripheral device is obtained.

14. A non-transitory computer readable storage medium having stored thereon a program that, when executed by a computer in which an operating system (OS) is executed that provides a first user interface (UI) environment and a second UI environment different from the first UI environment, causes the computer to perform a method comprising:
obtaining identification information of a peripheral device connected to a communication network, from the peripheral device; and
obtaining a device control application for controlling the peripheral device, from a service that manages applications operable in the first UI environment, using the identification information of the peripheral device if the identification information of the peripheral device has been obtained by the first obtaining when the first UI environment is provided by the OS, wherein the obtained device control application is different from the OS and a device driver,
wherein each application operating on the OS is created depending on any one of the first UI environment and the second UI environment, and switching between the first UI environment and the second UI environment can be performed according to control by the OS,
wherein in the second obtaining, when a device control application corresponding to the identification information is not obtained, a device driver corresponding to the identification information is obtained by searching an area to be searched for a device driver,
wherein in the second obtaining, if the identification information of the peripheral device has been obtained by the first obtaining when the second UI environment is provided by the OS, a device driver corresponding to the identification information is obtained by searching an area to be searched for a device driver,
wherein the first UI environment is more suitable for an operation on a touchscreen than the second UI environment, and wherein the second UI environment is provided to maintain compatibility with an OS having a version earlier than that of the OS.

* * * * *